United States Patent
Kia et al.

(10) Patent No.: US 7,150,915 B2
(45) Date of Patent: Dec. 19, 2006

(54) GEL COAT COMPOSITION FOR IN MOLD FINISH PROCESS

(75) Inventors: Sheila F Kia, Bloomfield Hills, MI (US); Devi N Rai, Rochester Hills, MI (US); Hamid G Kia, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 228 days.

(21) Appl. No.: 10/623,922

(22) Filed: Jul. 21, 2003

(65) Prior Publication Data

US 2004/0023050 A1 Feb. 5, 2004

Related U.S. Application Data

(60) Provisional application No. 60/402,784, filed on Aug. 12, 2002, provisional application No. 60/402,459, filed on Aug. 9, 2002, provisional application No. 60/400,324, filed on Aug. 1, 2002, provisional application No. 60/400,095, filed on Aug. 1, 2002.

(51) Int. Cl.
 *B32B 27/40* (2006.01)
(52) U.S. Cl. .................. 428/423.7; 428/482
(58) Field of Classification Search ............. 428/423.7, 428/482
 See application file for complete search history.

(56) References Cited

U.S. PATENT DOCUMENTS 4,029,848 A 6/1977 Nelson
4,182,830 A 1/1980 Ford, Jr.
4,244,993 A 1/1981 Platka, III et al.
4,382,055 A 5/1983 Koyanagi et al.
4,568,603 A 2/1986 Oldham

FOREIGN PATENT DOCUMENTS

DE 3026316 A1 2/1982
EP 0497721 A2 8/1992

(Continued)

OTHER PUBLICATIONS

"Microspheres", Encyclopedia of Polymer Science & Engineering, vol. 9, pp. 788-795.

(Continued)

*Primary Examiner*—Melanie Bissett
(74) *Attorney, Agent, or Firm*—Kathryn A. Marra

(57) ABSTRACT

Composite articles are prepared by a spray up operation. In a first step, a gel coat is applied onto a mold surface. Next, a barrier coat is applied over the gel coat in the mold and thereafter a laminate formula is applied over the barrier coat. In a preferred embodiment, the multilayer composite has a thickness of about 15 mm or less, and is useful as an automobile body panel. The gel coat contains a curable polyester polyurethane acrylate resin, and the composite article has a surface that has high gloss and color retention after prolonged exposure to ultraviolet radiation.

13 Claims, 1 Drawing Sheet

U.S. PATENT DOCUMENTS

| | | | |
|---|---|---|---|
| 4,587,323 | A | 5/1986 | Toman |
| 5,087,405 | A | 2/1992 | Maker |
| 5,159,044 | A | 10/1992 | Bogner |
| 5,213,747 | A | 5/1993 | Lippert |
| 5,534,211 | A | 7/1996 | Smeal et al. |
| 5,562,954 | A | 10/1996 | Harada et al. |
| 5,777,053 | A | 7/1998 | McBain et al. |
| 6,037,385 | A | 3/2000 | Smith |
| 6,367,406 | B1 | 4/2002 | Sahr et al. |
| 2004/0023012 | A1 | 2/2004 | Kia et al. |
| 2004/0038059 | A1 | 2/2004 | Kia et al. |
| 2004/0092697 | A1 | 5/2004 | Kia et al. |

FOREIGN PATENT DOCUMENTS

| | | | |
|---|---|---|---|
| GB | 1493547 | | 11/1977 |
| JP | 07258542 | | 9/1995 |
| JP | 200150559 | | 5/2001 |
| JP | 2001-150559 | * | 6/2001 |
| JP | 405301295 A | | 11/2003 |
| WO | WO/85 05113 | | 11/1985 |

OTHER PUBLICATIONS

Polyesters, Unsaturated, Encyclopedia of Polymer Science & Engineerig, vol. 12, pp. 256-275.

Copy of releavnt page from International Search Report from co-pening International Application Serial No. PCT/US03/22668.

Copy of releavnt page from International Search Report from co-pening International Application Serial No. PCT/US03/22677.

Copy of releavnt page from International Search Report from co-pening European Application Serial No. EP 03 01 6810.8.

* cited by examiner

GEL COAT COMPOSITION FOR IN MOLD FINISH PROCESS

CROSS REFERENCE TO RELATED APPLICATIONS

This application claims the benefit of U.S. provisional applications 60/400,324 filed Aug. 1, 2002, 60/400,095 filed Aug. 1, 2002, No. 60/402,459 filed Aug. 9, 2002, and 60/402,784 filed Aug. 12, 2002, the disclosures of which are incorporated by reference.

FIELD OF THE INVENTION

The present invention generally relates to gel coat finish layers and their use in combination with underlayers such as fiber reinforced cured polyester resins as a structural layer. More particularly, the invention relates to methods of manufacturing such articles by open tool molding for use as light-weight composites for automobile body panels.

BACKGROUND OF THE INVENTION

Light-weight composites are commonly used in manufacturing cars with lighter weight and improved fuel economy. The composites are currently produced using expensive steel tools and technologically advanced compression molding machines.

Open tool molding is a process for producing relatively low cost composite panels at low volumes. While steel molds are often used for other molding operations, the open tool molding process was developed to use less expensive one-sided epoxy or polyester molds to produce various products, such as composite panels with an in-mold finish. To obtain a reasonable surface appearance, the process requires the use of a gel coat over a supporting composite laminate. In the process, a mold surface is first cleaned, a mold release coating is optionally applied, and a layer of a gel coat is applied and partially cured. A laminate is then applied to the gel coat layer, and the laminate and gel coat are cured to form a unitary part having a surface defined by the cured gel coat. Molded parts can be produced by this method to have a finish bearing any desired color originally carried by the gel coat. However, attainment of a gel coat surface with a suitably smooth finish remains a challenge.

It is desirable to produce a pigmented gel coat, so as to eliminate the need of painting, and to provide good protection against fading due to heat and ultraviolet radiation. A particular challenge is to produce a surface finish on the gel coat that is both defect free and highly resistant to degradation from exposure to ultraviolet radiation.

Therefore, it is desirable to improve the surface appearance of the gel coat, and provide a part that will maintain color and high gloss when exposed to the elements.

SUMMARY OF THE INVENTION

In one aspect, the invention provides a method for preparing a composite article by spray up operation. In a first step, a gel coat is applied onto a mold surface which has been optionally pretreated with a mold release coating. Preferably, a barrier coat is next applied over the gel coat in the mold and thereafter a laminate formula is applied over the barrier coat. The gel coat contains a urethane acrylate resin and a pigment resin composition. In a preferred embodiment, the gel coat further comprises an ultraviolet inhibitor package and viscosity control agents to control sag and surface appearance. A gel coat composition can be produced that on curing yields a surface having a Class A finish and gloss retention of more than 60% when exposed to UV radiation of 4500 kJ/m$^2$. In a preferred embodiment, the multilayer composite article has a thickness of about 4 mm or less, and is useful as an automobile body panel.

The laminate preferably comprises a low shrink, low density glass fiber filled polyester resin. In a preferred embodiment, the paste of the laminate contains a dicyclopentadiene unsaturated polyester resin, polymeric hollow microspheres, and an initiator capable of initiating curing at room temperature or at temperature of 50° C. or less. The barrier coat preferably comprises a flexible fiber reinforced curable polyester resin. In a preferred embodiment, the fibers in the barrier coat are shorter than those of the laminate layer.

In another aspect, an automobile body panel is provided comprising a gel coat layer forming a surface of the panel, a laminate layer, and optionally and preferably a barrier layer disposed between the gel coat and the laminate layer. The gel coat layer contains a urethane acrylate resin, and in a preferred embodiment is pigmented. In a preferred embodiment, the cured gel coat layer has a class A finish, and has a gloss retention of 60% or more when exposed to 4500 kJ/m$^2$ of ultraviolet radiation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
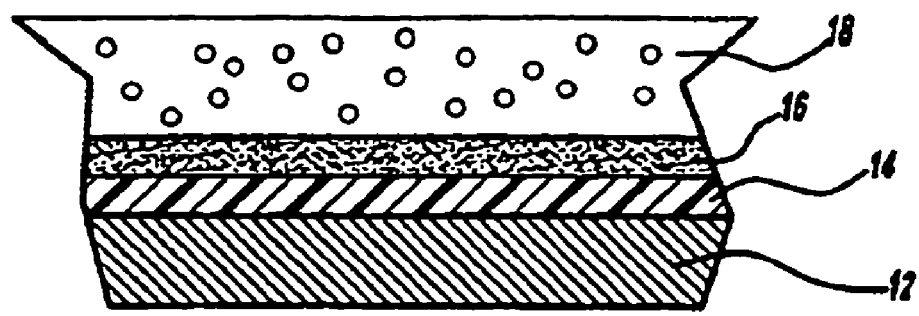
FIG. 1 is a diagram of a three layer composite of the invention in a mold.

Composite articles of the invention comprise a gel coat layer, a laminate layer, and preferably a barrier layer disposed between the gel coat and the laminate. FIG. 1 illustrates schematically a composite of the invention in a mold, including the preferred barrier layer. A three-layer composite is shown in contact with a surface of a mold 12. A gel coat layer 14 is applied directly to the mold surface. A barrier coat 16 is applied on top of the gel coat 14. A laminate layer 18 is applied on top of the barrier coat 16. An optional mold release layer (not shown) may be applied between the mold surface 12 and the gel coat layer 14.

Figure 2:
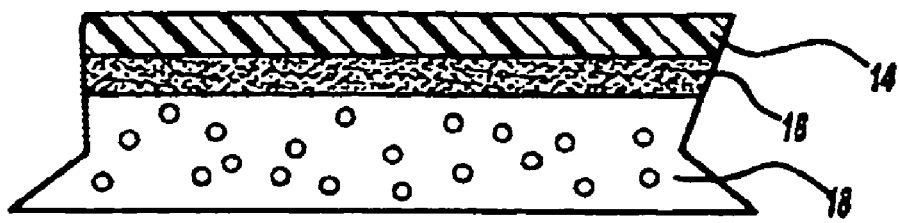
FIG. 2 is a diagram of a three layer composite of the invention after a release from the mold.

FIG. 2 shows in schematic form a composite 20 of the invention. Three layers are shown: a laminate layer 18, a barrier coat 16, and gel coat 14.

The laminate layer, described further below, is made of a cured polyester resin containing reinforcing fibers. The laminate layer provides most of the strength of the composite article. The gel coat layer may be pigmented. It is used to provide an esthetic appearance to the composite article. The optional barrier coat situated between the gel coat and the laminate provides protection from fiber read through. As such, it contributes to the esthetic appearance of the gel coat layer.

Composites of the invention are generally made by sequentially applying into a mold the various layers of the composite. After an optional mold release layer is applied, a gel coat is first applied into a mold. Thereafter a barrier coat may be applied over the gel coat and a laminate layer is applied over the barrier coat. Each layer may consist of one or more separate layers. In a preferred embodiment, the gel coat and the barrier coat are sprayed into the mold. In one aspect, each pass of the spray gun may be thought of as applying a thin layer. The effects of several passes of the spray gun used to apply the layers is to produce a built up gel coat or barrier coat layer as shown in the figures.

Similarly, the laminate layer may be sprayed on top of the barrier coat in a series of layers or passes with a spray gun. Alternatively, the laminate layer may be applied in a series of hand lay up steps wherein a glass mat is first installed in the mold over the barrier coat and then a paste formula is sprayed over the glass mat to wet out the glass and form the laminate layer.

The composite articles made according to the invention can have a range of thicknesses. Preferably, the laminate layer is thick enough to provide the needed stiffness, strength, or rigidity necessary for the application or end use of the composite article. In a preferred embodiment, the composites serve as automobile body panels. In this embodiment, the thickness of the composite article ranges from about 2 mm up to about 15 mm, preferably up to about 12 mm. More preferably, the thickness is from 3–8 mm. Of this, the gel coat is preferably from about 0.5–1.5 mm thick, the barrier coat from about 0.25 to 2 mm thick and the laminate layer from about 1 to about 5 mm thick.

The composite article is cured before release from the mold. Curing may continue in the demolded article. In preferred embodiments, the individual layers are partially cured after application before the next layer is applied. For example, a gel coat may be applied to a mold and partially cured. Thereafter the barrier coat is applied and again the gel coat and barrier coat are partially cured in the mold. Finally, a laminate layer is applied on top of the barrier coat and the composite article of the invention is cured. Curing is preferably carried out at low temperatures, for example at room temperature or at less than about 50° C.

Gel coats of the invention are based on a class of urethane acrylate resins. The main ingredients of the gel coats are resin, pigment paste, diluents, additives, and initiator, each of which will be further discussed below. In a preferred embodiment, the gel coats of the invention retain a gloss of 60–70% and the color stays consistent in the whole range of ultraviolet exposure of 500–4,500 kJ/m² in the Xenon accelerated weathering test. For example, the gel coats of the invention can obtain a DE rating of 3 or less in the Xenon test at 4,500 kJ/m².

The gel coat compositions typically contain from 30–60% of resin, preferably 30–50% and more preferably 35–45% resin, based on the total weight of the composition. The gel coat composition may contain pigment. When present, the pigment is typically present as a pigment paste, wherein the pigment paste is in the range of about 5–30% by weight of the total composition. In preferred embodiments, the pigment paste is present at from 10–30% by weight, and more preferably 10–25% by weight. Diluents are present in the gel coat composition at a range of about 10% to about 50% by weight of the composition, preferably from about 20% to about 40%. Additives make up the remainder of the composition. Such additives include, without limitation, dispersing agents, defoamers, ultraviolet light stabilizers, thixotropic agents, and the like. In addition, the compositions include up to 3% by weight of an initiator capable of initiating free radical polymerization of the monomers and the resins to cure the resin at a temperature of about 50° C. or less.

The resin of the gel coat is based on a urethane acrylate resin containing a polyurethane polymer with olefin functionality at the ends of the polymer. Preferred resins are urethanes, or polyurethanes, end capped with acrylic based monomers, especially urethanes based on a polyester polyol intermediate. In a preferred embodiment, the gel coat contains a resin described herein and in a provisional application 60/431,811 filed Dec. 9, 2002 and entitled "Urethane Acrylate Resin and Method of Making".

A urethane-acrylate gel coat resin of the present invention has an idealized structure (I)

C—B-A-B—C,     (I)

wherein (I) is the reaction product of an oligoester having $M_w$ of about 200 to about 4,000 (A), a diisocyanate (B), and a hydroxyalkyl (meth)acrylate (C). A urethane acrylate gel coat resin of the present invention is a reaction product of A, B, and C, thus other reactions species generally are present in addition to a resin of idealized structure (I).

In accordance with an important feature of the present invention, a present urethane acrylate gel coat resin contains an oligoester of $M_w$ about 200 to about 4000 that is reacted with a diisocyanate, and the resulting urethane product is end-capped with a hydroxyalkyl (meth)acrylate. The urethane acrylate resin therefore contains terminal vinyl groups available for free radical polymerization, typically using a peroxide catalyst.

The individual ingredients used in the manufacture of a present urethane acrylate gel coat resin are described in more detail below.

(a) Oligoester

The oligoester component (A) of a present urethane acrylate gel coat resin preferably has a weight average molecular weight of about 200 to about 4000 and preferably is prepared from one or more saturated polyol and one or more saturated or unsaturated polycarboxylic acid or dicarboxylic acid anhydride. As used herein, the terms "polyol" and "polycarboxylic" are defined as compounds that contain two or more, and typically two to four, hydroxy (OH) groups, or two or more, typically two or three, carboxyl (COOH) groups, respectively. Preferably, the oligoester is hydroxy terminated to provide reactive moieties for a subsequent reaction with a diisocyanate.

The polyesters typically are prepared from an aliphatic dicarboxylic acid or aliphatic dicarboxylic acid anhydride, and an aliphatic polyol. These ingredients are interacted preferably to provide a polyester having $M_w$ of about 200 to about 4000, more preferably about 400 to about 3500, and most preferably about 500 to about 3000. Accordingly, the polyesters are low molecular weight oligoesters.

The oligoester typically is prepared, for example, by condensing an aliphatic dicarboxylic acid or aliphatic dicarboxylic acid anhydride with a polyol, preferably a diol. The polyol and dicarboxylic acid or acid anhydride, in correct proportions, are interacted under standard esterification procedures to provide an oligoester having the necessary $M_w$, molecular weight distribution, branching, and hydroxy-terminated functionality for use in a present urethane acrylate gel coat resin. In particular, the relative amounts of dicarboxylic acid and polyol are selected such that a sufficient excess molar amount of the polyol is present in order to provide a hydroxy terminated oligoester.

Non-limiting examples of diols used to prepare the oligoesters include ethylene glycol, diethylene glycol, trimethylene glycol, propylene glycol, dipropylene glycol, hexylene glycol, 1,3-butylene glycol, 1,4-butylene glycol, neopentyl glycol, cyclohexanedimethanol, pinacol, pentanediol, 2,2-dimethyl-1,3-propanediol, isopropylidene bis(p-phyleneoxypropanol-2), a polyethylene or polypropylene glycol having a weight average molecular weight of about 500 or less, and mixtures thereof. A small amount of a triol or polyol, e.g., up to 5 mole %, more preferably 0 to 3 mole % of a triol or polyol, can be used to provide a partially branched, as opposed to linear, oligoester. Non-limiting examples of a triol include glycerol and trimethylolpropane.

Exemplary dicarboxylic acids, and anhydrides thereof, used to prepare a hydroxy-terminated oligoester include aliphatic dicarboxylic acids, such as, but not limited to, adipic acid, malonic acid, cyclohexanedicarboxylic acid, sebacic acid, azeleic acid, succinic acid, glutaric acid, and mixtures thereof. Substituted aliphatic dicarboxylic acids, such as halogen or alkyl-substituted dicarboxylic acids, also are useful.

Additional suitable dicarboxylic acids, and anhydrides thereof, include maleic, dihydroxymaleic, diglycollic, oxalacetic, oxalic, pimelic, suberic, chlorosuccinic, mesoxalic, acetone dicarboxylic, dimethyl malonic, 1,2-cyclopropanedicarboxylic, cyclobutane-1,1-dicarboxylic, cyclobutane-1,2-dicarboxylic, cyclobutane-1,3-dicarboxylic, cyclopentane-1,1-dicarboxylic, cyclopentane-1,2-dicarboxylic, 2,5-dimethylcyclopentane-1,1-dicarboxylic, alpha,alpha'-di-sec-butyl-glutaric, beta-methyl-adipic, isopropyl-succinic, and 1,1-dimethyl-succinic acids.

Additional suitable diols, triols, polyols, dicarboxylic acids and anhydrides, and polycarboxylic acids are disclosed for example in U.S. Pat. No. 5,777,053.

(b) Diisocyanate

The diisocyanate component (B) of a present urethane acrylate gel coat resin contains an aliphatic diisocyanate. The diisocyanate component optionally can contain up to about 20%, and preferably up to about 10%, by total weight of the diisocyanate, of an aromatic diisocyanate. The identity of the aliphatic diisocyanate is not limited, and any commercially available commercial or synthetic diisocyanate can be used in the manufacture of a urethane acrylate gel coat resin of the present invention.

Non-limiting examples of aliphatic diisocyanates include 1,6-hexamethylene diisocyanate, isophorone diisocyanate, 1,4-cyclohexane diisocyanate, 2,4'-dicyclohexylmethane diisocyanate, 4,4'-dicyclohexylmethane diisocyanate, 1,3-bis-(isocyanatomethyl)cyclohexane, 1,4-bis(isocyanatomethyl)cyclohexane, tetramethylxylylene diisocyanate, 1,11-diisocyanatoundecane, 1,12-diisocyanatododecane, 2,2,4-trimethyl-1,6-diisocyanatohexane, 2,4,4-trimethyl-1,6-diisocyanatohexane, 1,2-bis(isocyanatomethyl)cyclobutane, hexahydro-2,4-diisocyanatotoluene, hexhydro-2,6-diisocyanatotoluene, 1-isocyanato-2-isocyanatomethyl cyclopentane, 1-isocyanato-3-isocyanatomethyl-3,5,5-trimethyl cyclohexane, 1-isocyanato-4-isocyanatomethyl-1-methyl cyclohexane, 1-isocyanato-3-isocyanatomethyl-1-methyl cyclohexane, and mixtures thereof. A preferred aliphatic diisocyanate is isophorone diisocyanate.

Non-limiting examples of optional aromatic diisocyanates includes toluene 2,4-diisocyanate, toluene 2,6-diisocyanate, 4,4'-methylene diphenyl diisocyanate, 2,4'-methylene diphenyl diisocyanate, polymeric methylene diphenyl diisocyanate, p-phenylene diisocyanate, naphthalene-1,5-diisocyanate, and mixtures thereof.

(c) Hydroxyalkyl (meth)acrylate

The hydroxyalkyl (meth)acrylate component (C) of a present urethane acrylate gel coat resin is preferably a hydroxyalkyl ester of an α,β-unsaturated acid, or anhydride thereof. Suitable α,β-unsaturated acids include a monocarboxylic acid such as, but not limited to, acrylic acid, methacrylic acid, ethacrylic acid, α-chloroacrylic acid, α-cyanoacrylic acid, β-methylacrylic acid (crotonic acid), α-phenylacrylic acid, β-acryloxypropionic acid, cinnamic acid, p-chlorocinnamic acid, β-stearylacrylic acid, and mixtures thereof. As used throughout this specification, the term "(meth)acrylate" is an abbreviation for acrylate and/or methacrylate.

A preferred acrylate monomer containing a hydroxy group is a hydroxyalkyl (meth)acrylate having the following structure:

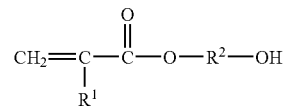

wherein $R^1$ is hydrogen or methyl, and $R^2$ is a $C_1$ to $C_6$ alkylene group or an arylene group. For example, $R^2$ can be, but is not limited to $(-CH_2-)_n$, wherein n is 1 to 6,

any other structural isomer of an alkylene group containing three to six carbon atoms, or can be a cyclic $C_3-C_6$ alkylene group. $R^2$ also can be an arylene group like phenylene (i.e., $C_6H_4$) or naphthylene (i.e., $C_{10}H_6$). $R^2$ optionally can be substituted with relatively non-reactive substituents, like $C_1-C_6$ alkyl, halo (i.e., Cl, Br, F, and I), phenyl, alkoxy, and aryloxy (i.e., an $OR^2$ substituent).

Specific examples of monomers containing a hydroxy group are the hydroxy($C_1-C_6$)alkyl (meth)acrylates, e.g., 2-hydroxyethyl methacrylate, 2-hydroxyethyl acrylate, 2-hydroxypropyl-methacrylate, and 3-hydroxypropyl methacrylate.

The relative amounts of (a), (b), and (c) used in the manufacture of a urethane acrylate gel coat resin of the present invention are sufficient to provide a reaction product having an idealized structure (I). Accordingly, component (a) is used in a molar amount of about 0.75 to about 1.25, and preferably about 0.9 to 1.1 moles; component (b) is used in an amount of 1.5 to about 2.5, and preferably about 1.7 to about 2.2 moles; and component (c) is used in an amount of about 1.5 to about 2.5, and preferably about 1.7 to about 2.2 moles. To achieve the full advantage of the present invention, the mole ratio of (a):(b):(c) is 1:1.7–2:1.75–2.

A urethane acrylate gel coat resin of the present invention is manufactured by first preparing the oligoester. The oligoester is prepared from a polyol, predominantly or completely a diol, and a polycarboxylic acid, predominantly or completely a dicarboxylic acid or anhydride thereof, using standard esterifying condensation conditions. The amounts and relative amounts of polyol and polycarboxylic acid are selected, and reaction conditions are used, such that the oligoester preferably has an $M_w$ of about 200 to about 4000 and is hydroxy terminated. The oligoester can be saturated or unsaturated.

The oligoester then is blended with the hydroxyalkyl (meth)acrylate, followed by addition of the diisocyanate. The resulting reaction leads to a mixture of products, including a species having the idealized structure (I). Structure (I) has terminal acrylate moieties available for polymerization using standard free radical techniques, e.g., using initiators such as peroxides or peroxy esters.

The resin further contains diluent monomers. The diluent monomers are preferably selected from the group consisting of alkyl esters or hydroxyalkyl esters of acrylic acid or methacrylic acid. Examples include, without limitation, methyl methacrylate and 2-(hydroxyethyl)methacrylate.

In a preferred embodiment, the gel coat composition contains a pigment composition. The pigment composition is generally present in the form of a pigment paste. The paste contains a major amount of a saturated or unsaturated polyester as a carrier resin. The paste further contains minor amounts of wetting and dispersing agents and inhibitors. Generally, the pigment paste may be up to about 30% of the weight of the gel coat composition. In a preferred embodiment, the pigment paste is about 17 to 20% by weight of the gel coat composition. Of that, the saturated polyester or unsaturated polyester makes up about 16 to 18% by weight. The pigment is present up to about 0.3% by weight. The wetting agent makes up to about 1 to 1.5% of the gel coat composition, and inhibitors in the pigment paste make up about 0.1 to 0.2% of the gel coat composition. The pigment paste of the invention may be made by adding pigment and additives to the polyester resin and mixing in a grinding machine.

The gel coat composition further contains diluents in addition to those found in the resin. Typically, the diluents are present at about 10 to 50% by weight of the total composition, preferably about 20–40% by weight. Preferably, the diluents include at least one alkyl acrylate or alkyl methacrylate monomer. A preferred diluent is methyl methacrylate. Optionally the diluents may further comprise a hydroxyl containing acrylate or methacrylate ester as described above in the description of the resin. Other monomers may be added to enhance the cure profile. Such monomers include, without limitation, styrene, vinyl toluene, α-methylstyrene, divinylbenzene, diallyl phthalate, triallyl cyanurate, and the like. A preferred monomer is styrene.

The gel coat composition may optionally contain difunctional or trifunctional acrylic ester diluents. Such di- and trifunctional acrylic esters are well known in the art and may be prepared for example by reacting acrylic acid or methacrylic acid with a variety of monomeric diols and triols, or with ethoxylated or propoxylated diols and triols. When present, the di- and trifunctional acrylic esters provide an amount of crosslinking on cure suitable for obtaining desirable film properties in the cured gel coat. As a general matter, a certain amount of crosslinking is desired to improve the strength and durability of the coating containing the crosslinked resin. On the other hand, crosslinking tends to increase the hardness and brittleness of the coating. Preferably, di- and trifunctional diluents are added to the gel coat compositions in amounts sufficient to improve the durability of the coatings without causing excessive rigidity or brittleness that could lead to cracking. The di- and trifunctional acrylate and methacrylate esters are present in the gel coat compositions at from 0 to about 30% by weight. In a preferred embodiment, they are present at from about 5% to 20% by weight. In a preferred embodiment, a mixture of difunctional crosslinker and trifunctional crosslinker is used.

In another preferred embodiment, at least one of the difunctional and trifunctional acrylic ester diluents is an acrylic ester of an alkoxylated diol or triol. Alkoxylated diols and triols are produced by reacting a diol or triol with an alkylene oxide or mixture of alkylene oxides. Preferred alkylene oxides include ethylene oxide and propylene oxide. Alkoxylated diols have preferably 2 to 20 moles of oxide added per mole of diol. Alkoxylated triols have preferably 3 to 30 moles of oxide added per mole of triol. In one embodiment, an alkoxylated triol acrylic ester diluent is provided, having 3 to 30, preferably 3 to 15, and more preferably 3 to 9 moles of alkylene oxide per mole of triol. In a preferred embodiment, the alkoxylated triol has 3 to 9 moles of propylene oxide.

Examples of the preferred diacrylic ester of an alkylene diol include triethylene glycol dimethacrylate, ethylene glycol dimethacrylate, tetraethylene glycol dimethacrylate, polyethylene glycol dimethacrylate, 1,3-butanediol diacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, tetraethylene glycol diacrylate, triethylene glycol diacrylate, 1,3-butylene glycol dimethacrylate, tripropylene glycol diacrylate, polyethylene glycol (400) diacrylate, polyethylene glycol (400) dimethacrylate, polyethylene glycol (600) diacrylate, propoxylated neopentyl glycol diacrylate, and alkoxylated aliphatic diol diacrylates. Examples of trifunctional acrylate esters of an alkylene polyol which can be optionally utilized include tris (2-hydroxyethyl) isocyanurate trimethacrylate, trimethylolpropane trimethacrylate, trimethylolpropane triacrylate, tris-(2-hydroxyethyl) isocyanurate triacrylate, tris-(2-hydroxyethyl) isocyanurate triacrylate, ethoxylated trimethylolpropane triacrylate, pentaerythritol triacrylate, propoxylated trimethylolpropane triacrylate, and propoxylated glycerol triacrylate.

Other additives make up the rest of the gel coat composition. Preferably, the gel coat compositions contain from 0.1 to 10% by weight, preferably from 0.2 to 5% by weight of additives that function as ultraviolet or light stabilizers. Light stabilizers for plastics and resin coatings are well known in the art and include without limitation benzophenones, xanthones, benzotriazoles, and hindered amine light stabilizers. The light stabilizers are available from a variety of commercial suppliers, including Ciba-Geigy (under the Tinuvin® and Chimassorb® lines) and BASF (under the Uvinul® designation). A wide variety of substituted benzophenones and xanthones is also available commercially from Norquay Technology, Inc.

Non-limiting examples of benzophenone UV light stabilizers include:

2,2',4,4'-Tetrahydroxybenzophenone;
2,2'-Dihydroxy-4,4'-dimethoxybenzophenone;
2,2'-Dihydroxy-4,4'-dimethoxy-5-sulfobenzophenone;
2,2'-Dihydroxy-4,4'-dimethoxybenzophenone-5,5'-disodium sulfonate;
2,2'-Dihydroxy-4-methoxybenzophenone;
2,4-Dihydroxybenzophenone;
2-Hydroxy-4-(2-hydroxy-3-methacryloxy) propoxybenzophenone;
2-Hydroxy-4-alkoxybenzophenones;

2-Hydroxy-4-Dodeyloxybenzophenone;
2-Hydroxy-4-methoxybenzophenone;
2-Hydroxy-4-methoxy-2'-carboxybenzophenone;
2-Hydroxy-4-methoxy-5-sulfobenzophenone trihydrate
2-Hydroxy-4-n-octyloxybenzophenone;
2-Hydroxy-4-octadecyloxybenzophenone; and
4-Dodecyloxy-2-hydroxybenzophenone.

Non-limiting examples of benzotriazole UV light stabilizers include:
2-(2'-Hydroxy-3',5'-di-t-amylphenyl) benzotriazole;
2-(2'-Hydroxy-3',5'-di-tert-butylphenyl) benzotriazole;
2-(2'-Hydroxy-3',5'-di-tert-butylphenyl)-5-chlorobenzotriazole;
2-(2'-hydroxy-3',5'-Di-tert-pentylphenyl) benzotriazole;
2-(2'-Hydroxy-3'-tert-butyl-5'-methylphenyl)-5-chlorobenzotriazole;
2-(2'Hydroxy-5'-methylphenyl) benzotriazole;
2-(2'-Hydroxy-5'-t-octylphenyl) benzotriazole;
2-(2'-Hydroxyphenyl) benzotriazole; and
2-[2'-Hydoroxy-3'-(3,4,5,6-tetra-hydrophthalimide-methyl)-5'-methylphenyl]benzotriazole.

Another class of preferred light stabilizers for the gel coats of the invention is the hindered amine light stabilizers. They function not but ultraviolet absorption but by their ability to scavenge or decompose radicals and hydroperoxides formed during photodegradation of polymers, and to quench singlet oxygen. They are available in a wide range of molecular weights and structures. A common type of hindered amine light stabilizer is based on a 2,2,6,6-tetraalkyl substituted piperidine ring. A variety of, for example, tetramethyl piperidines is commercially available. Examples include without limitation, Uvinul 4049H, Uvinul 4050H and Tinuvin 123. The Tinuvin 123 contains a major part of bis-(1-octyloxy-2,2,6,-tetramethyl-4-piperidyl) sebacate as active ingredient.

In a preferred embodiment the gel coat compositions of the invention contain from 0.2 to 2% by weight of a benzotriazole or benzophenone light stabilizer and from about 0.2 to 2% by weight of a hindered amine light stabilizer.

The gel coat composition also contain an initiator capable of initiating cure of the gel by a free radical polymerization mechanism at temperatures of about 50° C. or lower. Preferably, the initiator is capable of initiating cure at room temperature, or about 20–30° C. Generally, the initiator includes both an initiator compound and an activator or promoter. The initiator and activator work in combination to initiate cure at a desired processing temperature. Preferred initiators include various organic peroxides and peracids. Examples of initiators that initiate cure at a temperature of about 50° C. or less include, without limitation, benzoyl peroxide, methyl ethyl ketone hydroperoxide (MEKP), and cumene hydroperoxide. In a preferred embodiment, methyl ethyl ketone hydroperoxide is used in a level of about 1–3%. Activators such as cobalt octoate, cobalt 2-ethylhexanoate, and cobalt naphthenate are suitable for working with the methyl ethyl ketone hydrogen peroxide to initiate cure. Non-cobalt containing promoters such as dimethylacetoacetamide may also be used. In a preferred embodiment, the gel coat compositions contain up to 1% of a cobalt containing promoter and up to 1% of a non-cobalt containing promoter such as dimethylacetoacetamide.

To prepare the gel coat compositions, the additives may be added in sequence to the resin with stirring. Thereafter the pigment paste may be added. The mixture is mixed thoroughly, filtered and stored in a drum. The promoter, such as dimethylacetoacetamide or a cobalt compound may be added to the drum at this time, or may be added to the composition when the gel coat composition is sprayed into the mold. Generally the catalyst is not mixed in with the gel coat composition for storage. Rather, because the catalyst and promoter together initiate cure at room temperature or preferably 50° C. or less, the catalyst is added just before spraying, or is preferably mixed in line in the spray equipment as the gel coat composition is being applied to the mold.

The viscosity of the gel coat composition is preferably adjusted to a final viscosity of 3,000 to 4,000 CPS measured at 20 RPM. The gel time is preferably from about 3–6 minutes, and the thixotrope index is preferably adjusted to be in the range of 5.5 to 6.5.

In one aspect, the invention provides multilayer composite articles containing a gel coat layer comprising a thermosetting resin, a fiber reinforcing laminate layer comprising first fibers having a first length, and a barrier layer disposed between the gel coat and the laminate layers. The barrier layer contains second fibers having a second length shorter than the first length dispersed in a polyester resin. In a preferred embodiment, the polyester resin of the barrier coat comprises up to 25% of an isophthalic resin, based on the total weight of the polyester resin. In another preferred embodiment, the polyester resin comprises 75–100% by weight of a dicyclopentadiene resin. In another embodiment, the polyester resin contains 75–99% by weight dicyclopentadiene resin and 1–25% by weight isophthalic resin. The second fibers are preferably glass fibers and the second length is preferably 1 mm or less, more preferably 0.5 mm or less. In other embodiments, the glass fibers of the barrier coat are 1/64 inch (about 0.4 mm) or less. The barrier coat may further comprise polymeric hollow microspheres. The microspheres may be added to the barrier coat layer to reduce the density. Typically up to about 5% polymeric hollow microspheres by weight may be added to the barrier coat composition.

The barrier coat is described below and in U.S. provisional application 60/400,324 filed Aug. 1, 2002 entitled "Barrier Coat For Open Tool Molding". The barrier coat typically contains an unsaturated polyester resin. As such it contains hydroxyl groups that are capable of binding either covalently or via hydrogen bonds to function groups of the gel coat, resulting in good interlayer adhesion. Preferably, the barrier coat provides enough flexibility to avoid cracking and sufficient rigidity so as to shield the gel coat from the effects of any shrinkage that the laminate structure undergoes upon cure. The stiffness of the barrier coat, which is a combination of its rigidity and its thickness, mitigates against fiber read through. The fiber read through is observed in gel coats directly coating fiber reinforced laminate layers. For automobile panels, the resulting fiber read through generally results in undesirable surface appearance in the gel coat. The barrier coats of the invention are applied in part to minimize the fiber read through. In a preferred embodiment, the barrier coat contains glass fibers having a length of 1 mm or less, preferably having a length of 0.5 mm or less.

Another function of the barrier coat is to separate the shrinkage of the laminate layer from the gel coat and prevent the shrinkage from harming the esthetic properties of the gel coat surface. The barrier coat should be flexible enough so as not to crack under those conditions and have enough rigidity to support the gel coat. Flexibility is generally reflected in the property of tensile elongation at break, such as is measured with ASTM method D-638. It has been found that a tensile elongation at break of 0.5% or less is indicative of a barrier coat that is too brittle. Preferably the tensile elongation at break of the barrier coat is at least 1% and preferably about 2% or greater. In a preferred embodiment, a tensile elongation of 2–3% has been found acceptable.

In a preferred embodiment, short reinforcing fibers are added to the barrier composition to increase the strength and modulus. In a typical composition, the flexural modulus is about 1900 MPa and the tensile modulus is about 1896 MPa.

Reinforcing fibers for the barrier coat may be selected from glass fibers, carbon fibers, and ceramic fibers. In a preferred embodiment, glass fibers are used for convenience. The invention will be further described and exemplified by reference to glass fibers.

The length of the glass fibers in the barrier coat is preferred to be less than the length of the fibers in the laminate coat. In a preferred embodiment, the glass fibers in the barrier coat are of such a length that they may be readily sprayed with conventional spray equipment. Thus, glass fibers no longer than about 0.5 mm in length—the size of a nozzle of conventional spray equipment—are preferred. In a preferred embodiment, the glass fibers are of a diameter of 5–10 micrometers.

Milled glass fibers are commercially available having lengths of less than about 0.5 mm. In a preferred embodiment, milled glass fibers of 1/64 inch (about 0.4 mm) are formulated into the polyester resin of the barrier coat formulation. In another preferred embodiment, milled glass fibers having a length of about 0.001 inch (about 0.025 mm) are used. It is believed that the presence of the milled glass fibers in the barrier coat also contributes to the property of reducing or eliminating fiber read through from the laminate to the gel coat.

Other reinforcing fibers, such as ceramic fibers or carbon fibers can also be used in the barrier coat to provide the favorable properties. However, glass fibers are usually preferred, for example because of lower costs. Preferably, the fibers in the barrier coat provide the barrier coat with enough flexibility and strength to avoid cracking during demolding and handling.

To achieve the desired flexibility, the barrier coat contains a flexible polyester resin. Preferably, the polyester resin of the barrier coat comprises up to 25% of an isophthalic resin, based on the total weight of the polyester resin. In a preferred embodiment, the polyester resin comprises 75–100% and preferably 75–99% by weight of a dicyclopentadiene resin. That is, in a preferred embodiment, the polyester resin of the barrier coat contains a major part of a dicyclopentadiene resin and at least one other resin. In a preferred embodiment, the polyester resin of the barrier coat comprises dicyclopentadiene resin and an isophthalic acid resin in ratio of at least 4:1. It has been found that barrier coats with such polyester resin compositions can achieve the desired flexibility of a tensile elongation of at least about 1% at break, as measured by ASTM D-638. In a preferred embodiment, the resin component of the barrier coat composition contains 80–100 parts of dicyclopentadiene resin and up to 20 parts isophthalic acid resin.

The laminate layer of the invention is described herein and in provisional application 60/400,095 entitled "Low Shrink Low Density Laminate Formulation, filed Aug. 1, 2002. It contains reinforcing fibers in a cured resin, preferably a cured unsaturated polyester resin. In a preferred embodiment, it contains about 40–80% by weight of a paste and about 20–60% by weight of reinforcing fibers. Preferably, the paste contains, by percent based on the total weight of the paste, 70% or more of an unsaturated polyester resin curable at a temperature of 50° C. or lower, up to 25% of a filler comprising particles having a density lower than that of the resin, and an initiator composition capable of initiating cure of the resin at a temperature of 50° C. or lower. The polyester resin of the laminate layer is preferably a low shrink resin, exhibiting a volume shrinkage upon cure of less than about 9.6%, preferably 9% or less and more preferably about 8% or less. In a preferred embodiment, the polyester resin of the laminate layer comprises a dicyclopentadiene unsaturated polyester resin. The structure and synthesis of the polyester resins are discussed further below.

The filler comprising particles having a density lower than that of the resin preferably comprises hollow microspheres, also known as micro balloons or micro bubbles. Typically, they range in size from about 5 to about 200 microns, with a wall thickness between about 0.4 and 1.5 microns. They generally have a density in the range of from about 0.03 to about 0.5 g/cm$^3$. The microspheres are used to reduce the density of the layer in which they found by displacing some of the resin with air that is encapsulated in the thin wall spheres.

The microspheres are made from material particles by heating them in the presence of blowing agents. The microspheres may be hollow glass microspheres, hollow ceramic microspheres, hollow polymeric microspheres, hollow carbon microspheres, or combinations of them. Hollow polymeric microspheres can be prepared from an aqueous suspension or solution of a film forming resin and a blowing agent. The blowing agents are typically low boiling point hydrocarbons or inorganic or organic material that decomposes to provide a blowing agent.

When glass hollow microspheres are used as the filler, they may comprise up to about 25% by weight of the paste. Polymeric hollow microspheres are lighter than the glass hollow microspheres. Accordingly, when polymeric hollow microspheres are used, it is preferred to use them at a level up to 5% by weight of the paste. In a preferred embodiment, the paste contains 90% or more by weight unsaturated polyester resin and up to 5% by weight polymeric hollow microspheres. In a preferred embodiment, the unsaturated polyester resin is a low shrink resin such as a dicyclopentadiene resin discussed below. Glass and polymeric microspheres may also be used together. In such a case, the polymeric microspheres comprise up to 5% by weight of the paste, while the glass and polymeric microspheres together make up to 25% by weight of the paste.

In a preferred embodiment, the laminate layer of the invention exhibits a relatively low density as well as sufficient strength for the end use. For example, the laminates layer typically has a density of 1.3 g/cm$^3$ or less, and more preferably 1.2 g/cm$^3$ or less.

Hollow microspheres are commercially available. For example, an expanded polymeric microsphere based on copolymer shells of an acrylonitrile and PVDC coated with calcium carbonate is available from Pierce and Stevens Corp. under the trade name Dualite M6017AE.

The unsaturated polyester resins contained in the laminate layer, and the barrier coat are well known in the art and available from a variety of commercial sources. They contain an unsaturated monomer and a polyester polymer produced by copolymerization of a polyol component, generally a diol, and a polycarboxylic acid component, generally a dicarboxylic acid. At least part of the polycarboxylic component is made up of an unsaturated carboxylic acid or carboxylic anhydride.

Styrene is the most commonly used unsaturated monomer, and is preferred. Other unsaturated monomers usable to make polyester resins of the invention include, without limitation, vinyltoluene, methyl methacrylate, diallyl phthalate, α-methylstyrene, triallyl cyanurate, and divinylbenzene.

Polyol and diol components used to make polyester resin include without limitation propylene glycol, ethylene glycol, diethylene glycol, neopentyl glycol, dipropylene glycol, dibromoneopentyl glycol, bisphenol dipropoxy ether, propylene oxide, 2,2,4-trimethylpentane-1,3-diol, tetrabromobisphenol dipropoxy ether, 1,4-butanediol, and dicyclopentadiene hydroxyl adducts.

Saturated dibasic acids or anhydrides include, without limitation, phthalic anhydride, isophthalic acid, adipic acid, chlorendic anhydride, tetrabromophthalic anhydride, tetrahydrophthalic anhydride, terephthalic acid, tetrachlorophthalic anhydride, glutaric acid, and cyclopentadiene-maleic anhydride Diels-Alder adducts. Examples of unsaturated acids or anhydrides include without limitation maleic anhydride, fumaric anhydride, methacrylic acid, acrylic acid, and itaconic acid.

When the polycarboxylic acid component comprises one of the phthalic, isophthalic, or terephthalic acid derivatives such as those mentioned above, the polyester resin is commonly referred to an "isophthalic resin" or "isophthalic base resin".

When the diol or glycol component contains the dicyclopentadiene hydroxyl adducts mentioned above, or when the dicarboxylic acid or anhydride component includes dicyclopentadiene-maleic anhydride Diels-Adler types of adducts, the polyester resins are commonly referred to as dicyclopentadiene resins, or DCPD resins. During the process to make the dicyclopentadiene resins, dicyclopentadiene can dissociate into cyclopentadiene monomer. Both the monomer and the dimer can react with maleic anhydride or other unsaturated acids as well as with the diol components to form resins exhibiting both terminal cycloaliphatic ether and cycloaliphatic dibasic acid groups derived from cyclopentadiene and unsaturated acid ester derivatives.

In a non-limiting example, to make a DCPD resin, dicyclopentadiene may be added gradually to a reactor in which maleic anhydride and a glycol have been added. Depending on the addition rate and the reactor temperature, dicyclopentadiene initially enters into chain termination reactions with the glycol maleates. At higher temperatures, dicyclopentadiene dissociates into cyclopentadiene and enters into Diels-Adler types of addition reactions with unreacted, unsaturated acid anhydride and with the glycol maleates or other polyester polymer species containing unsaturation.

Reinforcing fibers are used in the laminate layer and alternatively in the barrier coat of the composites of the invention. The reinforcing fibers in the laminate layer may be selected from the group consisting of glass fibers, carbon fibers, and ceramic fibers. In a preferred embodiment, the fibers in the laminate layer have a length of 6 mm (about ¼ inch) or longer. Preferably, the fiber length is about 12 mm or greater and in a particularly preferred embodiment, the reinforcing fiber has a length of about 25 mm (about 1 inch). Glass fibers are generally preferred because of their lower costs. They are commercially available in the form of glass fiber roving which is composed of many glass bundles. Each bundle in turn is composed of thousands of filaments The filaments have diameters from 5 to 15 micrometers.

Other conventional additives may be used in formulating the laminate layer and the barrier coat in the composites of the invention. These include, without limitation, solvents, wetting agents, and dispersing additives. Defoamers may be used as air release additives, and thixotropes such as fumed silica may be added to adjust the viscosity. Such additives are well known in formulating cured polyester components and are illustrated in the Examples below.

The polyester resins of the laminate layer and the barrier layer preferably also contain an initiator composition that is capable of initiating cure of the polyester resin compositions at a reasonably low temperature. In preferred embodiment, cure occurs at 50° C. or less. In a particularly preferred embodiment, cure occurs at around room temperature or about 20°–30° C. Generally, the initiator composition includes both an initiator compound and an activator or promoter. The initiator and the activator or promoter work in tandem to kick off initiation at a desired processing temperature. Preferred catalysts or initiators include various organic peroxides and peracids. Particularly preferred are those initiators or catalysts capable of initiating cure at a temperature of about 50° C. or less. Examples include without limitation benzoyl peroxide, methyl ethyl ketone hydroperoxide (MEKP), and cumene hydroperoxide. For the preferred MEKP, activators such as cobalt octoate, cobalt 2-ethylhexanoate, and cobalt naphthenate may be added, resulting in initiator compositions capable of curing the polyester resin at a temperature from about room temperature up to 50° C. Typically, the initiator is held separately from the rest of the composition until the final spray. During spray, the initiator and polyester resin composition are combined, and cure begins. Some commercially available polyester resins include promoters such as the cobalt octoate and cobalt naphthenate mentioned above. In this case it is necessary to provide the initiator catalyst, such as MEKP, separately upon spraying to begin cure of the layer.

In one embodiment, the invention provides a method for preparing a composite using a spray up operation, comprising the steps of applying a gel coat into a mold, applying a barrier coat over the gel coat, and applying a laminate formula over the barrier coat. The laminate formula preferably contains 40–80% by weight of a paste and 20–60% by weight of reinforcing fibers. The paste contains 70% or more by weight of an unsaturated polyester resin, up to 25% of a filler, and an initiator composition capable of curing the resin at a temperature of 50° C. or lower. In a preferred embodiment, the paste contains up to 25% by weight glass hollow microspheres. In another preferred embodiment, the paste contains 90% or more by weight of an unsaturated polyester resin and up to 5% by weight polymeric hollow microspheres. In another embodiment, the paste contains up to 25% by weight total of glass and polymeric microspheres, with the polymeric microspheres present at up to 5% by weight of the paste. In a preferred embodiment, the gel coat is applied to a thickness of from 0.2 mm to 2 mm, the barrier coat to a thickness of 0.5 to 5 mm, and the laminate layer or layers to a thickness from 1 to 10 mm. In another embodiment, the gel coat is applied to a thickness of about 0.5–1.5 mm, the barrier coat is applied to a thickness of about 0.25 to 2 mm, and the laminate layer is applied to a thickness of about 1 to about 5 mm. In a preferred embodiment, the composite is to be used as an automobile body panel, having a thickness of from 2 to 15 mm, preferably from 2 to 12 mm, more preferably from 3 to 8 mm. In a preferred embodiment, the composite is about 4 mm thick.

In a preferred embodiment, the laminate layer comprises a laminate composition containing a paste and a filler wherein the paste comprises a low shrink polyester resin such as a dicyclopentadiene resin, up to 5% by weight polymeric hollow microspheres, and an initiator capable of initiating cure at a temperature of 50° C. or less. The laminate composition also contains a filler comprising reinforcing fibers having a length greater than or equal about 6 mm, preferably greater than or equal about 12 mm. In a particularly preferred embodiment, the laminate layer comprises glass fibers of approximately 25 mm (1 inch) in length.

Composite articles are prepared according to the invention comprising a gel coat layer, a laminate layer and a barrier layer disposed between the gel coat and the laminate.

In an alternate method, the laminate layer may be applied by hand laying a glass cloth on top of the barrier coat layer in the mold and applying a laminate resin composition to the glass cloth. The laminate resin composition comprises 70% or more by weight of a low shrink polyester resin and up to 25% of glass hollow microspheres or 90% or more by weight resin and up to 5% by weight of polymeric hollow microspheres. In a preferred embodiment, the composite article is used as an automotive body panel. In one embodiment, the maximum thickness of the body panel is about 6 mm and in another preferred embodiment, the maximum thickness of the body panel is about 4 mm.

The invention has been described above with respect to preferred embodiments. Further non-limiting examples are given in the examples that follow.

EXAMPLES

The following abbreviations are used in the Examples:

| | |
|---|---|
| NPG | neopentyl glycol |
| MA | maleic anhydride |
| DBTDL | Dibutyl tin dilaurate |
| HEMA | 2-hydroxyethylmethacrylate |
| HEA | 2-hydroxyethyl acrylate |
| IPDI | isophorone diisocyanate |
| MMA | methyl methacrylate |
| THQ | toluhydroquinone |
| TMP | trimethylolpropane |
| HALS | hindered amine light stabilizer |
| BYK-A-555 | silicone defoamer, commercially available from BYK-Chemie USA, Inc. |
| AEROSIL 200 | fumed silica, commercially available from Degussa Corporation |
| SARTOMER SR-9021 | highly propoxylated 5.5 glyceryl triacrylate, commercially available from Sartomer, Exton, PA |
| SARTOMER SR-206 | ethylene glycol dimethacrylate, commercially available from Sartomer, Exton, PA |
| DMAA | dimethyl acetoacetamide |
| TINUVIN 928 | 2-(2H-benzotriazol-2-yl)-6-(1-methyl-1-phenyl-ethyl-4-(1,1,3,3-tetramethylbutyl)phenol, commercially available from Ciba Specialty Chemicals Corporation |
| TINUVIN 123 | bis-(1-octyloxy-2,2,6-tetramethyl-4-piperidyl) sebacate, a commercially available HALS from Ciba Specialty Chemicals Corporation |

Example 1

NPG (101.64 wt. parts), MA (60.59 wt. parts), and DBTDL (0.42 wt. parts) were added into a flask equipped with a packed column and agitator. The resulting mixture was heated to a maximum of 440° F. and reacted to an acid number of about 5–10 under a nitrogen atmosphere by removing water (11.14 wt. parts). To the resulting oligoester (151.65 wt. parts) was added 2,6-di-t-butyl-p-cresol (0.65 wt. parts) and HEA (75.71 wt. parts) at 200° F. IPDI (114.28 wt. parts) was added to the resulting mixture via an addition funnel to maintain the exothermic reaction temperature below 200° F. The reaction was maintained at 200° F. for one hour followed by the addition of MMA (107.69 wt. parts) as a solvent and THQ (0.03 wt. parts) as an inhibitor. The resulting product was 80%, by weight, urethane acrylate gel coat resin in 20%, by weight, MMA solvent.

Example 2

The urethane acrylate gel coat resin of this example contains a saturated oligoester. As in Example 1, the oligoester is reacted with IPDI and HEA to produce a urethane polyester copolymer having acrylic unsaturation at the terminal positions. The resin of Example 2 is prepared in a manner essentially identical to Example 1.

| Ingredient | Moles | Wt. Parts |
|---|---|---|
| 1. 1,6-Hexanediol | 2.69 | 24.76 |
| 2. TMP | 0.07 | 0.68 |
| 3. Adipic acid | 2 | 22.66 |

Ingredients 1–3 were reacted under esterifying conditions to remove 5.78 wt. parts of water, and provide an oligoester (40.78 wt. parts) of equivalent weight 239.1. The following ingredients were added to the oligoester, and reacted to form a urethane acrylate gel coat resin of the present invention.

| Ingredient | Moles | Wt. Parts |
|---|---|---|
| 4. DBTDL | | 0.08 |
| 5. 2,6-di-t-butyl-p-cresol | | 0.13 |
| 6. HEA | 2.11 | 13.92 |
| 7. IPDI | 4 | 25.30 |
| 8. THQ | | 0.006 |
| 9. MMA | | 19.79 |

Example 3

1,6-Hexanediol (94.8 wt. parts) and TMP (2.6 wt. parts) were added into a flask equipped with an agitator, and the mixture was melted. Next, adipic acid (86.8 wt. parts) was added, and the resulting mixture was heated to 440° F., under a nitrogen atmosphere. An esterification reaction was performed, at a maximum temperature of 460° F., until the acid number was less than 10, preferably less than 7. Water (21.1 wt. parts) was removed during the reaction. The resulting oligoester was cooled to 140° F. using a one part air sparge and 2 part nitrogen blanket. Next, DBTDL (0.31 wt. parts), 2,6-di-t-butyl-p-cresol (0.53 wt. parts), HEA (55.7 wt. parts), and IPDI (101.2 wt. parts) were added to the oligoester. The IPDI was added at a rate such that the exothermic reaction was maintained below 200° F. (e.g., over about 30–60 minutes). The reaction was continued for 2 to 3 hours, periodically testing for free isocyanate groups (% NCO). A % NCO of less than 0.3 is preferred. At the completion of the reaction, THQ (0.03 wt. parts) and MMA (79.2 wt. parts) were added slowly to the urethane acrylate gel coat resin at a temperature below 190° F. The resulting mixture was stirred at 140° F. for at least one hour. The resulting product contained 80% urethane acrylate gel coat resin and 20% MMA solvent.

The urethane acrylate gel coat resins of the present invention can be used in gel coat compositions. A resin of the present invention is the base resin of the gel coat composition, and can be formulated with other standard gel coat composition ingredients. The urethane acrylate gel coat resin can be cured by polymerization of the terminal acrylate groups using standard free radical techniques.

In particular, gel coat compositions can be formulated using the resins of this invention in the usual method. Gel coat compositions include pigments, extenders, promoters, catalysts, stabilizers, and the like as practiced in the art. Such gel compositions typically comprise about 25 to about 50 weight percent urethane acrylate gel coat resin, and about 10 to about 50 weight percent styrene or other vinyl monomer, said percentages being based on combined weights of resin and vinyl monomer. Other gel coat composition-ingredients include acrylic diluents (e.g., MMA), additives (e.g., silica, cobalt salts, silicone release agent, hydroxyalkyl (meth) acrylates, dimethyl acetoacetamide), a pigment paste, a free radical initiator (e.g., methyl ethyl ketone peroxide), UV stabilizers, thixotropes, and other resins (e.g., an isophthalic-NPG-maleic unsaturated polyester).

The preparation of a gel coat composition, and curing of a gel coat composition to provide a gel coat for an article of manufacture are also generally disclosed in WO 94/07674 and U.S. Pat. No. 4,742,121.

EXAMPLE 4

General Dark Color Gel Coat Formula

|  | wt. % |
|---|---|
| Urethane acrylate gel coat resin (80% in MMA) | 38–50 |
| Styrene | 0–5 |
| Air release agent | .1–1 |
| Thixotrope | .5–3 |
| Reactive monomer | 20–35 |
| Cobalt | .1–.5 |
| Cobalt promoter | .2–.7 |
| UV inhibitor | .2–.5 |
| HALS | .2–1 |
| Glycol synergist | .1–1.5 |
| Pigment paste | 10–25 |

Fillers (e.g., mica, aluminum trihydrate, barium sulfate, and the like) are optional ingredients present at 0–15 wt. %. Blocked isocyanates are also optional ingredients present at 0–20 wt. %.

Examples of reactive monomers include, but are not limited to, methyl methacrylate (10–20 wt. %), ethylene glycol dimethacrylate, e.g., SARTOMER SR-206 (1–10 wt. %), highly propoxylated glyceryl triacrylate, e.g., SARTOMER SR-9021 (0–10 wt. %), and mixtures thereof.

The pigment paste contains a pigment in an unsaturated polyester carrier resin. The paste also contains wetting agents, dispersing agents, and inhibitors, in minor amounts. Saturated polyesters also can be used as the carrier resin. The carrier resin also can be different from a polyester, e.g., a urethane diacrylate, an acrylic silicone, or similar resin. The pigment paste is prepared by adding the pigment and other ingredients to the carrier resin, then mixing in a grinding machine.

EXAMPLE 5

Blue Gelcoat Composition

| Ingredient | Weight (kg) |
|---|---|
| Urethane acrylate gel coat resin of Example 2 | 42 |
| Styrene monomer | 4 |
| BYK-A 555 | 1 |
| AEROSIL 200 | 2 |

EXAMPLE 5-continued

Blue Gelcoat Composition

| Ingredient | Weight (kg) |
|---|---|
| Grind to 6 on Hegmann gauge | |
| SARTOMER SR 9021 | 10 |
| SARTOMER SR-206 | 1 |
| Methyl methacrylate | 19 |
| Cobalt octoate (12%) in mineral spirits and dipropylene glycol monomethyl ether | 0.5 |
| DMAA | 0.1 (gram) |
| TINUVIN 928 | .5 |
| TINUVIN 123 | 1 |
| 2-hydroxyethyl methacrylate | 1 |
| Blend 10 minutes | |
| Blue tinter | 17 |
| White tinter | 1 |

EXAMPLE 6

White Gelcoat Composition

| Ingredient | Weight (kg) |
|---|---|
| Urethane acrylate gel coat resin of Example 2 | 24.6149 |
| Styrene monomer | 4 |
| BYK-A 555 | 1 |
| AEROSIL 200 | .5 |
| Grind to 6 on Hegmann Gauge | |
| SARTOMER SR-9021 | 7 |
| SARTOMER SR-206 | 1 |
| Methyl methacrylate | 17.175 |
| Cobalt octoate (12%) in mineral spirits and dipropylene glycol monomethyl ether | .2 |
| DMAA | .1 gram |
| TINUVIN 928 | .5 |
| TINUVIN 123 | 1 |
| 2-Hydroxyethyl methacrylate | 1 |
| Blend 10 minutes | |
| Blue tinter | .01 |
| White tinter | 42 |

Example 7—Preparation of Gel Coat Compositions

The following components may be used to prepare the gel coat compositions of the invention. The numbers in the right-hand column are percent by weight based on the total weight of the composition. Typically, all of the ingredients except the initiator are combined into a gel coat composition. The initiator is added to the rest of the composition just before spraying into the mold or as the composition is being sprayed into the mold.

| Description | Weight % |
|---|---|
| Polyester-Polyurethane Acrylate | 30–60 |
| Styrene Monomer | 0–10 |
| Solution of foam destroying polymers | 0–2 |
| Thixotropic agent | 0.5–2.5 |
| Trifunctional acrylate | 0–20 |
| Difunctional acrylate | 0–10 |
| (meth)acrylate monomer | 5.0–25 |
| Co-containing promoter | 0–1.0 |
| Non-cobalt promoter | 0–1.0 |
| Non-HALS light stabilizer | 0–5.0 |

-continued

| Description | Weight % |
|---|---|
| HALS | 0–5.0 |
| Hydroxyl functional (meth)acrylate monomer | 0–10 |
| Polyester polyol | 0–1.0 |
| Solution of polyhydroxy carboxylic acid amides | 0–2.0 |
| Solution of foam destroying polysiloxanes | 0–2.0 |
| Solution of polyether modified methyl-alkyl-polysiloxane copolymer | 0–2.0 |
| (color pigments dispersed in a carrier polyester paste) | 0–30 |
| Cure initiator | 1.0–3.0 |

Example 8—Gel Coat Composition

A gel coat composition is formulated with the following ingredients.

| Component | Description | Weight % |
|---|---|---|
| Resin | Polyester-Polyurethane Acrylate Resin | 42.5 |
| Styrene Monomer | Styrene Monomer | 4.0 |
| BYK A 555 | Solution of foam destroying polymers | 1.0 |
| Aerosil 200 | Fumed silica | 1.0 |
| Trifunctional acrylate | Propoxylated (5.5) Glycerol Triacrylate | 10.1 |
| Difunctional Acrylate | Ethylene glycol dimethacrylate | 1.0 |
| MMA | Methyl methacrylate | 17.8 |
| Cobalt 12% | Cobalt Octoate (12%) | 0.5 |
| Eastman DMAA | Dimethyl acetoacetamide | 0.4 |
| Tinuvin 928 | 2-(2H-Benzotriazol-2-yl)-6-(1-methyl-1-phenylethyl)-4-(1,1,3,3,-tetramethylbutyl)phenol | 0.5 |
| Tinuvin 123 | bis-(1-octyloxy-2,2,6,-tetramethyl-4-piperidyl) sebacate | 1.0 |
| HEMA | 2-(hydroxyethyl)methacrylate | 1.0 |
| PDGG:Adipic Acid Polyol | Poly[di(ethylene glycol)/glycerol-adipic acid] polyol | 0.2 |
| BYK R 605 | Solution of polyhydroxy carboxylic acid amides | 0.4 |
| BYK 66N | Solution of foam destroying polysiloxanes | 0.2 |
| BYK A 525 | Solution of polyether modified methyl-alkyl-polysiloxane copolymer | 0.5 |
| Pigment paste | (blue pigments dispersed in a carrier polyester paste) | 18.2 |
| MEKP | Butanox LPT by Akzo Nobel | 1.5 |

Example 9—Gel Coat Composition

A gel coat composition is formulated with the following ingredients.

| Component | Description | Weight % |
|---|---|---|
| Resin | Polyester-Polyurethane Acrylate Resin | 38.5 |
| Styrene Monomer | Styrene Monomer | 7.0 |
| BYK A 555 | Solution of foam destroying polymers | 0.4 |
| Aerosil 200 | Fumed silica | 1.6 |
| Difunctional acrylate | SR 206: Ethylene glycol dimethacrylate | 5.5 |
| MMA | Methyl methacrylate | 12.3 |
| Cobalt 12% | Cobalt Octoate (12%) | 0.8 |
| Eastman DMAA | Dimethyl acetoacetamide | 0.2 |
| Tinuvin 928 | 2-(2H-Benzotriazol-2-yl)-6-(1-methyl-1-phenylethyl)-4-(1,1,3,3,-tetramethylbutyl)phenol | 3.3 |
| Tinuvin 123 | bis-(1-octyloxy-2,2,6,-tetramethyl-4-piperidyl) sebacate | 0.2 |
| HEMA | 2-Hydroxyethyl methacrylate | 3.3 |
| PDGG:Adipic Acid Polyol | Poly[di(ethylene glycol)/glycerol-adipic acid] polyol | 1.3 |
| BYK R 605 | Solution of polyhydroxy carboxylic acid amides | 0.4 |
| BYK A 525 | Solution of polyether modified methyl-alkyl-polysiloxane copolymer | 0.4 |
| Pigment paste | (green pigments dispersed in a carrier polyester paste) | 25.3 |
| MEKP | Butanox LPT by Akzo Nobel | 1.3 |

Example 10—Gel Coat Composition

A gel coat composition is formulated with the following ingredients.

| Component | Description | Weight % |
|---|---|---|
| Resin | Polyester-Polyurethane Acrylate Resin | 35.5 |
| Styrene Monomer | Styrene Monomer | 9.5 |
| BYK A 555 | Solution of foam destroying polymers | 1.0 |
| Aerosil 200 | Fumed silica | 1.0 |
| Trifunctional acrylate | Propoxylated (5.5) Glycerol Triacrylate | 2.2 |
| Difunctional acrylate | Ethylene glycol dimethacrylate | 8.9 |
| MMA | Methyl methacrylate | 8.5 |
| Cobalt 12% | Cobalt Octoate (12%) | 0.5 |
| Eastman DMAA | Dimethyl acetoacetamide | 0.4 |
| Tinuvin 928 | 2-(2H-Benzotriazol-2-yl)-6-(1-methyl-1-phenylethyl)-4-(1,1,3,3,-tetramethylbutyl)phenol | 0.5 |
| Tinuvin 123 | bis-(1-octyloxy-2,2,6,-tetramethyl-4-piperidyl) sebacate | 2.0 |
| PDGG:Adipic Acid Polyol | Poly[di(ethylene glycol)/glycerol-adipic acid] polyol | 0.2 |
| BYK 66N | Solution of foam destroying polysiloxanes | 0.2 |
| BYK A 525 | Solution of polyether modified methyl-alkyl-polysiloxane copolymer | 0.5 |
| Pigment paste | (white pigments dispersed in a carrier polyester paste) | 29.4 |
| MEKP | Butanox LPT by Akzo Nobel | 1.5 |

Example 11—Preparation of a Laminate Formulation

The following components are mixed together to form a laminate formulation. The table gives the amount by weight of each component used. The amounts are expressed as parts by weight of the paste, unless otherwise indicated. As stated earlier, the laminate comprises the paste and fiber. In this Example, the fibers constitute about 38% by weight of the laminate and the balance is the paste. A description of each component follows as well as the method for preparing a laminate paste from the components.

| Components | Parts |
|---|---|
| AOC VX-2190 | 130 |
| Byk W-972 | 1.05 |
| Byk R-605 | 0.30 |

-continued

| Components | Parts |
|---|---|
| Byk A-555 | 0.30 |
| AN bubbles (Dualite, M6017AE) | 3.00 |
| Fumed Silica (TS-720) | 1.60 |
| MEKP (Aldrich, 32% in DMP) | 1.95 |
| Glass Fiber (Certainteed 299) | 38% |

AOC VX-2190 is a sprayable unsaturated polyester resin with a styrene monomer content of 32.52%, manufactured by Alpha/Owens-Corning. It contains a dicyclopentadiene resin. A thixotrope has been added by the manufacture to bring its viscosity to a Brookfield viscosity of 670 cps using an RVT viscometer at 20 RPM with a #3 spindle. The component also contains a promoter, cobalt 2-ethylhexanoate. The density is 1.100 g/cc.

BYK W-972 is a wetting and dispersing additive manufactured by BYK. The density is 1.010 g/cc.

BYK R-605 is a wetting and dispersing additive manufactured by BYK. It facilitates dispersion during incorporation of fumed silicas. It increases and stabilizes thixotropic behavior. The density is 0.930 g/cc.

BYK A-555 is an air release additive manufactured by BYK. It is a solution of silicon free, foam destroying polymers with a density of 0.880 g/cc.

Dualite M6017AE is expanded polymeric microspheres based on copolymer shells of acrylonitrile and PVDC (polyvinylidene chloride) coated with calcium carbonate, manufactured by Pierce and Stevens Corp. The mean particle size is 70 microns, and the density is 0.13 g/cc.

TS-720 is a fumed silica thixotrope manufactured by Cab-O-Sil. The apparent density is 0.050 g/cc.

MEKP is a methyl ethyl ketone peroxide solution manufactured by Aldrich. It is a 32% solution in dimethyl phthalate.

Glass Fiber Certainteed #299 is a glass fiber 299-207-CT manufactured by Certainteed. The average length of the glass fiber is 1 inch. The density is 2.54 g/cc.

The above components (minus the glass fibers) are mixed as follows to form a paste:

Liquid VX-2190 resin is weighed into a five-gallon metal can. Thereafter the liquid W-972, R-605, and A-55 are added and stirred slightly with a wooden tongue depressor. The above liquid components are then mixed at 400 RPM for 5 minutes. The polymeric microspheres, Dualite M6017AE are slowly mixed in over a seven minute period. Next the fumed silica, TS-720 is added over a seven minute period. The mixing speed is increased to 700 RPM for about eleven minutes until the paste temperature reaches a temperature of about 26° C. The mixing speed is reduced to 400 RPM and mixing continues for an additional 2 minutes.

The peroxide initiator, MEKP, is added through the spray gun during part preparation. The gun is also set to deliver 38 parts by weight glass fiber for every 62 parts of the paste.

The formulation can be adjusted to provide a range of final viscosities to meet the processing requirements. The viscosity of the formula above is about 1290 cps measure at 22° C. using a Brookfield RVT viscometer, spindle number 3 at 20 RPM. In a lab test, an epoxy mold is treated with mold release. Then a 0.5 mm gel coat is applied to the mold and partially cured, followed by a barrier coat of 1.0 mm thickness. After partial curing, a 2.5 mm thick laminate is applied in two steps using the above formulation. In the first step a 1 mm thick laminate is applied and partially cured, followed by a 1.5 mm thick laminate. Following complete cure of all layers, the composite panel is demolded. The composite has an excellent surface appearance.

Example 12—Preparation of a Laminate Formulation

The following components are used in the preferred ranges indicated.

| Component | Density | Range |
|---|---|---|
| Yabang DC-191 | 1.100 | 90–100 |
| Byk S 750 | 0.840 | 0–1.0 |
| Byk R 605 | 0.930 | 0–0.9 |
| Byk A 555 | 0.880 | 0–0.5 |
| PBQ (Ashland Mod E - 5%) | 1.130 | 0–0.3 |
| Cobalt Naphthenate (8%) | 0.950 | 0.05–0.2 |
| AN Bubbles (Dualite, M6017AE) | 0.130 | 0–5.0 |
| Fumed silica (PTG) | 1.800 | 0–3.0 |
| Black (CM-2015) | 1.24 | 0–0.5 |

Yabang DC-191 is a sprayable unsaturated polyester resin with a styrene monomer content of 29.76% manufactured by Yabang in China. It is a fumaric acid based polyester containing dicyclopentadiene, dimethylstyrene, and dicyclopentyl alcohol. There is no promoter or thixotrope. The Brookfield viscosity is 378 cps using an RVT viscometer at 20 RPM with a #2 spindle. The resin contains the promoter, cobalt naphthenate.

S-750 is a combination of waxes with polar components, manufactured by BYK. It is used as a styrene emission suppressant developed specially for DCPD resins.

R-605 is a wetting and dispersing additive to facilitate dispersion during incorporation of fumed silicas. It is manufactured by BYK.

A-555 is a solution of silicone free foam-destroying polymers that acts as an air release additive, manufactured by BYK.

Modifier E is an inhibitor solution of 4.99 weight percent para-benzoquinone in diallyl phthalate, manufactured by Ashland Chemical Co.

Cobalt naphthenate is a promoter for polyester resins manufactured by Sigma Chemical Co. It is 8% by weight cobalt.

Dualite M6017AE is expanded polymeric microspheres manufactured by Pierce and Stevens.

CM-2015 black is a colorant manufactured by Plasticolors.

PTG is an untreated fumed silica thixotrope manufactured by Cab-O-Sil.

Delta X-9 is methyl ethyl ketone peroxide solution manufactured by Elf Atochem NA Glass Fiber #299-207-CT is a 1 inch glass fiber manufactured by Certainteed.

A low density laminate paste may be formulated as follows:

Liquid Yabang DC-191 polyester resin is weighed into a 5 gallon can. The liquid S-750 wax is first mixed well in its container and then weighed into a smaller container. The polyester resin is stirred at 400 RPM while the wax is slowly added. Mixing continues for a total of 10 minutes and stopped.

The liquid R-605 and liquid A-555 is weighed into the can of the polyester resin mixture and stirred slightly with a wooden tongue depressor. The liquid modifier E, weighed earlier in a syringe, is added and stirred slightly with a wooden tongue depressor. The 5 gallon can is now positioned under a mixer and a mixing blade attached. The liquid components are mixed at 400 RPM for 5 minutes.

The liquid cobalt naphthenate, weighed earlier in a syringe, is added while mixing continues for a total of 5 minutes. The polymeric microspheres, Dualite M6017AE are slowly mixed in over a 5 minute period. The black colorant CM-2015 is mixed in over a 3 minute period. While continuing stirring at 400 RPM, the fumed silica is slowly added over a 4 minute period. After all the fumed silica is added, the mixing speed is increased to 700 RPM for about 6 minutes until the paste reaches a temperature of about 26° C. The total time of mixing until the paste reaches this temperature varies depending on the ambient temperature. Then the mixing speed is reduced to 400 RPM and mixing is stopped after 2 additional minutes. The total mixing time is about 30 minutes.

A peroxide initiator (Delta X-9) is added to the spray gun during part preparation. The gun is also set to deliver the glass fibers simultaneous with application of the paste and initiator.

Examples 13–15

Laminate formulations are put together with the ingredients indicated below, according to the general procedures described in Examples 5 and 6. In all examples, the MEKP and the glass fibers are added through the spray gun during part preparation.

EXAMPLE 13

| Component | Parts |
| --- | --- |
| Yabang DC-191 | 100.00 |
| Byk S 750 | 1.00 |
| Byk R 605 | 0.23 |
| Byk A 555 | 0.23 |
| PBQ (Ashland Mod E - 5%) | 0.110 |
| Cobalt Naphthenate (8%) | 0.090 |
| AN Bubbles (Dualite, M6017AE) | 2.31 |
| Fumed silica (PTG) | 0.57 |
| Black (CM-2015) | 0.05 |
| MEKP (Delta X-9) | 2.3 |
| Glass Fiber (Certainteed 299) | 52.37 |

EXAMPLE 14

| Component | Parts |
| --- | --- |
| AOC VX-2190 | 100.00 |
| Byk S 750 | 1.00 |
| Byk R 605 | 0.23 |
| Byk A 555 | 0.23 |
| PBQ (Ashland Mod E - 5%) | 0.110 |
| Cobalt Naphthenate (8%) | 0.090 |
| Glass microspheres K46 (3M) | 10.50 |
| Fumed silica (PTG) | 0.31 |
| Black (CM-2015) | 0.05 |
| MEKP (Delta X-9) | 2.2 |
| Glass Fiber (Certainteed 299) | 52.37 |

EXAMPLE 15

| Component | Parts |
| --- | --- |
| Yabang DC-191 | 100.00 |
| Byk R 605 | 0.23 |
| Byk A 555 | 0.23 |
| PBQ (Ashland Mod E - 5%) | 0.110 |
| Cobalt Naphthenate (8%) | 0.090 |

EXAMPLE 15-continued

| Component | Parts |
| --- | --- |
| AN Bubbles (Dualite, M6017AE) | 2.31 |
| Glass microspheres K46 (3M) | 10.50 |
| Fumed silica (PTG) | 0.57 |
| Black (CM-2015) | 0.05 |
| MEKP (Delta X-9) | 2.3 |
| Glass Fiber (Certainteed 299) | 43.51 |

Example 16

A barrier coat composition is formulated as follows.

| Components | Parts |
| --- | --- |
| AOC VX-2190 | 100 |
| Byk W 972 | 0.81 |
| Glass Bubbles (3M, K46/4000) | 21.00 |
| Milled Glass Fiber (OCF 1/64") | 41.42 |
| Fumed Silica (TR-720) | 0.61 |
| MEKP (Aldrich, 32% in DMP) | 1.95 |
| Total | 165.79 |

AOC VX-2190 is a sprayable unsaturated polyester resin with a styrene monomer content of 32.52%, manufactured by Alpha/Owens-Corning. It contains a dicyclopentadiene resin. A thixotrope has been added by the manufacture to bring its viscosity to a Brookfield viscosity of 670 cps using an RVT viscometer at 20 RPM with a #3 spindle. The component also contains a promoter, cobalt 2-ethylhexanoate. The density is 1.100 g/cc.

BYK W-972 is a wetting and dispersing additive manufactured by BYK. The density is 1.010 g/cc.

Glass Bubbles (3M,K46/4000) are glass hollow microspheres sold by 3M.

Milled Glass Fiber is glass fibers of 5–10 micrometers in diameter and an average length of 1/64", available commercially from Owens Corning.

TR-720 is a fumed silica thixotrope manufactured by Cab-O-Sil. The density is 0.050 g/cc.

MEKP is methyl ethyl ketone peroxide available from Aldrich as a 32% solution in dimethylphthalate The formulation can be adjusted to provide a range of final viscosities to meet processing requirements. In a lab test, a glass plate is treated with mold release for ease of demolding. Then a 0.5 mm gel coat is applied on the glass plate and partially cured. A barrier coat layer of 0.5 mm thickness is then applied containing the components listed above. After partial cure of the barrier coat a 3 mm thick laminate is applied in two steps. In the first step a 1 mm thick laminate is applied and partially cured followed by a 2 mm thick laminate. The laminate is a polyester resin reinforced with 25% by weight chopped fibers. After complete cure of all layers at room temperature the plaque is demolded. The surface is smooth and free of fiber read through. A similar process with no barrier coat is conducted and the resultant plaque shows extensive fiber read through. The thickness of the barrier coat may need to be adjusted depending on the processing conditions, the chemistry and the thickness of the gel coat and the laminate.

Example 17

Formulation of a Barrier Coat

Formulation of a Barrier Coat

| Component | density, g/cm³ | Range |
|---|---|---|
| Yabang DC-191 | 1.100 | 75–100 |
| Eterset 2110-1 | 1.100 | 0–25 |
| Styrene Monomer | 0.907 | 0–10 |
| Byk W 972 | 1.010 | 0–1.0 |
| Byk W 605 | 0.930 | 0–0.9 |
| Byk A 555 | 0.880 | 0–0.5 |
| PBQ (Ashland Mod E - 5%) | 1.130 | 0–0.3 |
| AN Bubbles (Dualite, M6017AE) | 0.130 | 0–5.0 |
| Glass bubbles (3M, K37) | 0.37 | 0–5.0 |
| Cobalt Naphthenate (8%) | 0.950 | 0.05–0.2 |
| N,N-Dimethylaniline | 0.956 | 0–0.3 |
| Med Teal Blue (CF-31977) | 1.500 | 0–0.3 |
| Milled Glass Fiber (OCF 1/64") | 2.540 | >0–30 |
| Fumed silica (PTG) | 1.800 | 0–3.0 |

Yabang DC-191 is a sprayable unsaturated polyester resin with a styrene monomer content of 29.76% manufactured by Yabang in China. It is a fumaric acid based polyester containing dicyclopentadiene, dimethylstyrene, and dicyclopentyl alcohol. There is no promoter or thixotrope. The Brookfield viscosity is 378 cps using an RVT viscometer at 20 RPM with a #2 spindle. The resin contains the promoter, cobalt naphthenate.

Eterset 2110-1 is a flexible phthalic acid based polyester resin manufactured by Eternal Chemical Company, Taiwan. It contains no promoter or thixotrope. It has a styrene monomer content of 23.26%, a viscosity of 2384 cps using an RVT viscometer at 10 RPM with a #2 spindle.

Styrene monomer, manufactured by J. T. Baker, has a density of 0.907.

BYK W-972 is a wetting and dispersing additive manufactured by BYK. The density is 1.010 g/cc.

BYK R-605 is a wetting and dispersing additive manufactured by BYK. It facilitates dispersion during incorporation of fumed silicas. It increases and stabilizes thixotropic behavior. The density is 0.930 g/cc.

BYK A-555 is an air release additive manufactured by BYK. It is a solution of silicon free, foam destroying polymers with a density of 0.880 g/cc.

PBQ is Modifier E from Ashland Chemical Co. It is an inhibitor solution of 5% para-benzoquinone in diallyl phthalate.

AN Bubbles (Dualite M6017AE) is expanded polymeric microspheres based on copolymer shells of acrylonitrile and PVDC coated with calcium carbonate, manufactured by Pierce and Stevens Corp. The mean particle size is 70 micrometers, and the density is 0.13 g/cc.

Glass Bubbles (3M,K37) are glass hollow microspheres sold by 3M.

Cobalt naphthenate (8%) contains 8% by weight cobalt metal. It is a promoter for room temperature curing of polyester resins, available from Sigma Chemical Co.

N,N-Dimethylaniline is a tertiary amine used as an accelerator, manufactured by EM Science.

Medium teal blue is a colorant manufactured by Plasticolors, Inc. Colorants are used to differentiate the barrier coat from the gel coat. It is used to help the spray/chop operator spray a more uniform barrier coat thickness.

Milled glass fiber is 737-BC 1/64 inch, manufactured by Owens-Corning.

PTG is an untreated fume silica thixotrope manufactured by Cab-O-Sil.

Delta X-9 is a methyl ethyl ketone peroxide solution manufactured by Elf Atochem.

A barrier coat composition is formulated from the above components as follows.

The liquid Yabang DC-191 polyester resin is weighed into a 5 gallon metal can. The Eterset 2110-1 polyester resin weighed into the can and stirred slightly with a wooden tongue depressor. The styrene monomer, W-972, W-605, and A-555 are weighed into the can and stirred slightly with a wooden tongue depressor.

Liquid Modifier E, weighed earlier in a syringe, is added and stirred slightly with a wooden tongue depressor. The 5 gallon can is positioned under a mixer and the mixer blade is attached.

About 50–60 grams of the Dualite M6017AE polymeric bubbles are added to the liquid component. Then the mixer is turned on and the combination mixed at 400 RPM for about 1 minute. The balance of the polymeric bubbles is added over an additional 9 minute mixing period.

The medium blue teal colorant is then mixed in over a 2 minute period. The liquid cobalt naphthenate, weighed earlier in a syringe, is added over a 2 minute period. Then the dimethylaniline, weighed earlier in a syringe, is mixed in over a 2 minute period.

Mixing continues at 400 RPM while the milled glass fiber is added during a 5 minute period. Finally the fumed silica is slowly added over a 7 minute period.

The mixing speed is increased to 700 RPM for about 7 minutes or until the paste reaches a temperature of 29° C. The mixing time varies depending on the ambient temperature. The mixing speed is reduced to 400 RPM and stopped after an additional 2 minutes of mixing. The total mixing time is about 37 minutes. Delta X-9 peroxide initiator is added to the spray gun during part preparation at a treatment level of about 1–2%.

Examples 18–20

Barrier coats are formulated according to Example 2, with the following ingredients.

EXAMPLE 18

| Component | Parts |
|---|---|
| Yabang DC-191 | 77.5 |
| Eternal 2110-1 | 22.5 |
| Styrene Monomer | 5 |
| Byk W 972 | 0.81 |
| Byk W 605 | 0.6 |
| Byk A 555 | 0.23 |
| PBQ (Ashland Mod E - 5%) | 0.044 |
| AN Bubbles (Dualite, M6017AE) | 4.8 |
| Cobalt Naphthenate (8%) | 0.1 |
| N,N-Dimethylaniline | 0.2 |
| Med Teal Blue (CF-31977) | 0.03 |
| Milled Glass Fiber (OCF 1/64") | 30 |
| Fumed silica (PTG) | 3 |
| MEKP (Delta X-9) | 2.2 |

EXAMPLE 19

| | |
|---|---|
| Yabang DC-191 | 90.5 |
| Eternal 2110-1 | 9.95 |

EXAMPLE 19-continued

| | |
|---|---|
| Byk W 972 | 0.81 |
| Byk A 555 | 0.23 |
| PBQ (Ashland Mod E - 5%) | 0.05 |
| AN Bubbles (Dualite, M6017AE) | 4.2 |
| Cobalt Naphthenate (8%) | 0.1 |
| N,N-Dimethylaniline | 0.2 |
| Med Teal Blue (CF-31977) | 0.03 |
| Milled Glass Fiber (OCF 1/64") | 25 |
| Fumed silica (PTG) | 2.5 |
| MEKP (Delta X-9) | 2.2 |

EXAMPLE 20

| | |
|---|---|
| AOC VX2190 | 91.2 |
| Byk W 972 | 0.81 |
| PBQ (Ashland Mod E - 5%) | 0.05 |
| AN Bubbles (Dualite, M6017AE) | 3.5 |
| Glass microspheres K46 (3M) | 15 |
| Cobalt Naphthenate (8%) | 0.1 |
| N,N-Dimethylaniline | 0.2 |
| Med Teal Blue (CF-31977) | 0.03 |
| Milled Glass Fiber (OCF 1/64") | 20 |
| Fumed silica (PTG) | 2.7 |
| MEKP (Delta X-9) | 2.2 |

Example 21—Preparation of A Composite Article

A gel coat composition according to Examples 4–10 is sprayed into a mold to a desired thickness. Next a barrier coat composition such as described in Examples 16–20 is applied in the mold over the gel coat. Next, a laminate formulation, such as described in Examples 11–15, is applied as follows.

An operator hooks up a spray gun, such as are commercially available from Magnum in Florida to a bucket containing a paste, a second bucket containing a solution of the cure initiator, and a source of fiber glass rovings. On operation of the gun, the paste and the initiator are combined and sprayed onto the barrier coat in the mold. At the same time the glass rovings are advanced through a cutter to deliver 1" glass fibers that meet the solution of paste and initiator in mid-air and fall on the barrier coat in the mold. The operator continues to operate the gun with spraying in a side-to-side motion until the desired thickness of build up of the laminate applied in the mold is obtained. Thereafter, the composite is allowed to cure in the mold, followed by demolding of the article. Cure may be carried out at room temperature or up to about 50° C. Depending on the temperature, the cure time may range from several minutes to several hours to up to a day.

The description of the invention is merely exemplary in nature and, thus, variations that do not depart from the gist of the invention are intended to be within the scope of the invention. Such variations are not to be regarded as a departure from the spirit and scope of the invention, which are defined in the dependent claims.

We claim:

1. A composite article comprising a gel coat layer, a laminate layer, and a barrier layer disposed between the gel coat and laminate, wherein the laminate layer comprises reinforcing fibers in a cured polyester resin and the gel coat comprises a cured polyester polyurethane acrylate resin,
wherein the gel coat layer forms a surface of the article that maintains 60% or more of its gloss after exposure to 4500 kJ/m$^2$ of ultraviolet radiation, and
wherein the barrier layer comprises fibers having a length of 1 mm or less.

2. A composite article according to claim 1, wherein the composite article comprises an automobile body panel.

3. An article according to claim 1, wherein the total thickness of the article is 2–12 mm.

4. An article according to claim 1, wherein the total thickness of the article is 3–8 mm, the thickness of the gel coat is 0.5–1.5 mm, the thickness of the barrier coat is 0.75–2 mm, and the thickness of the laminate layer is 1–5 mm.

5. An article according to claim 1, wherein the reinforcing fibers comprise glass fibers having a length of 6 mm or greater.

6. An article according to claim 1, wherein the laminate layer comprises a cured dicyclopentadiene unsaturated polyester resin.

7. An article according to claim 1, wherein the density of the laminate layer is 1.2 g/cm$^3$ or less.

8. An automobile body panel, comprising a cured multilayer composite article comprising:
a gel coat layer;
a laminate layer; and
a barrier layer disposed between the gel coat layer and the laminate layer,
wherein the laminate layer comprises reinforcing glass fibers in a matrix of a cured polyester resin, and
wherein the gel coat forms a surface of the body panel that maintains 60% or more of its gloss after exposure to 4500 kJ/m$^2$ of ultraviolet radiation, and
wherein the barrier layer comprises fibers having a length of 1 mm or less.

9. A body panel according to claim 8, wherein the gel coat layer comprises a cured polyester polyurethane acrylate resin.

10. An automobile body panel according to claim 8, wherein the body panel has a class A finish.

11. An automobile body panel according to claim 8, wherein the maximum thickness of the body panel is about 6 mm.

12. An automobile body panel according to claim 8, wherein the maximum thickness of the body panel is about 4 mm.

13. An automobile body panel according to claim 8, wherein the gel coat has a thickness of 0.5–1.5 mm.

* * * * *